Nov. 12, 1929.    R. P. BRYANT    1,735,636
FLEXIBLE COLLAR
Filed Aug. 21, 1926

Inventor
Ryland P. Bryant
By Watson E. Coleman
Attorney

Patented Nov. 12, 1929

1,735,636

UNITED STATES PATENT OFFICE

RYLAND P. BRYANT, OF MARION, SOUTH CAROLINA

FLEXIBLE COLLAR

Application filed August 21, 1926. Serial No. 130,635.

This invention relates to a flexible collar for gang, band and circular saw grinders, and it is primarily an object of the invention to provide a collar of this kind which is designed for use as an emery wheel arbor attachment, operating to permit the grinder to sharpen the teeth uniformly and to a point without the use of a file for finishing.

Another object of the invention is to provide a collar of this kind adapted to be attached directly to the arbor of a grinder without necessitating any extensions of the arbor and which collar, when in applied or working position, permits an end motion of the arbor sufficient to eliminate burning or case hardening the points of the saw teeth which would otherwise cause the saw to shed the points and mark the lumber.

It is also an object of the invention to provide a collar of this kind which can be attached directly to the arbor of any grinder without necessitating arbor extensions.

An additional object of the invention is to provide a collar or attachment of this kind which is adapted to be engaged directly with an end portion of an arbor and without requiring any special construction of the arbor or adjacent bearing and which is applicable with equal facility upon new and old work, the collar when applied taking the place of the conventional holding nut or member now generally employed.

The invention consists in the details of construction and in the combination and arrangement of the several parts of my improved flexible collar whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1:
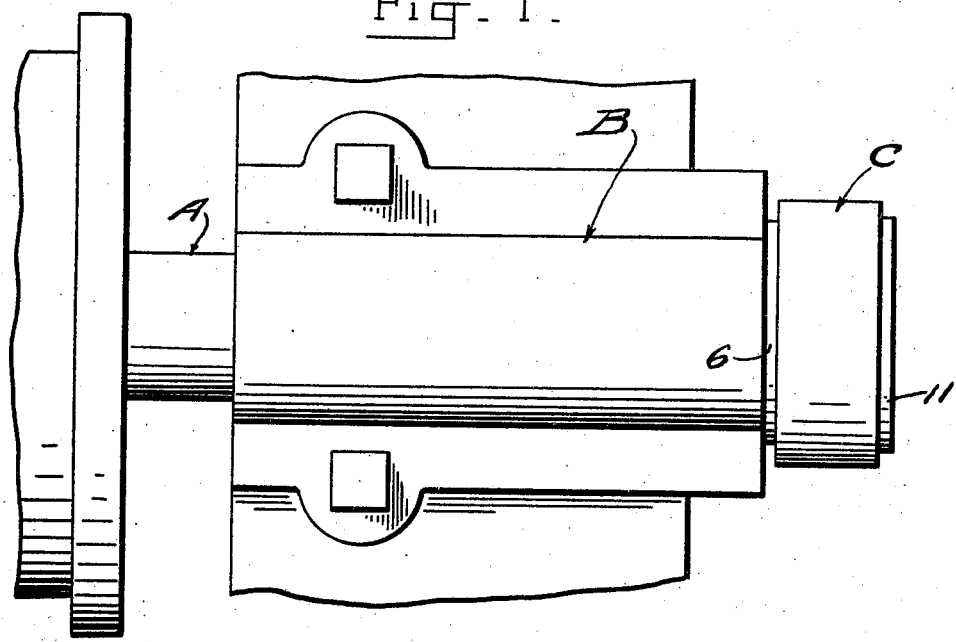
Figure 1 is a view in elevation illustrating a collar or attachment constructed in accordance with an embodiment of my invention and in applied position.
Figure 2:
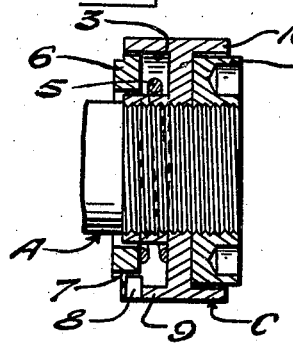
Figure 2 is a view partly in section and partly in elevation of my improved device in applied position.
Figure 3:
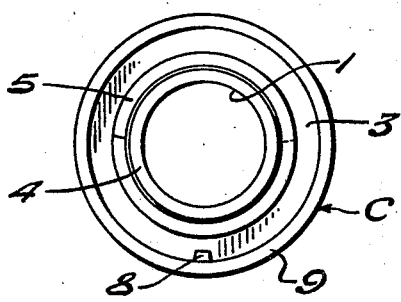
Figure 3 is a view in elevation of the inner face of the device as illustrated in Figure 2 unapplied, with the annular member or washer removed.
Figure 4:
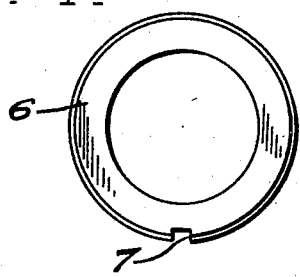
Figure 4 is a view in elevation of the annular member or washer herein employed.
Figure 5:
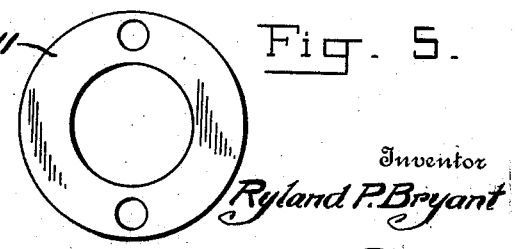
Figure 5 is a view in elevation of the outer face of the holding nut as herein employed.

As disclosed in the accompanying drawing, A denotes an emery wheel arbor of a conventional type which has an end portion rotatably engaged within the bearing or box B. Engaged with an end portion of said arbor A outwardly of the bearing or box B is a collar C, the wall 1 of the bore of said collar being threaded for engagement with said end portion of the arbor A.

The collar C comprises an outer broad annular body 9 having an annular web formed about the inner wall midway between the edges thereof and formed about the edge of this web is a flange 4, which is concentric with the outer portion and extends to terminate in the same plane as the adjacent edge of the outer portion. There is thus formed between the flange and the outer portion the annular recess 3.

Surrounding the flange 4 is a coil spring 5 preferably comprising a single convolution. Snugly engaged within the outer portion of the recess or channel 3 is an annular member or washer 6 which is constantly urged outwardly by the spring 5 bearing against the web 4' for direct contact with the adjacent face of the bearings or box B. The periphery of the member or washer 6 is provided with a notch 7 in which is received an inwardly directed pin or member 8 carried by the outer portion 9 of the collar 3. By this means the collar C and the member or washer 6 are keyed or locked one to the other and thereby held against independent rotation.

It is also to be noted that the recess 3 is of a depth to entirely receive or house the washer 6 so that in the event abnormal strain is imposed upon the washer through the arbor A, the washer 6 will be received entirely within the recess 3 and thus permit the collar C to have direct contact with the bearing B. This will prevent injury to the connection between the collar and recess as afforded by the pin 8 and the notch 7 or to the spring 5.

The other edge of the annular portion of the collar C forms in association with the web 4' a flange 10 whereby is provided, when the device is in position on the arbor, a recess or pocket in which is received a portion of a nut 11 threaded upon the arbor, which nut bears against the web as shown. The recess or pocket permits the attachment or collar to be readily and effectively applied in a close place.

The central flange 4 serves to hold the spring 5 in direct line with the shaft or arbor so as to get the exact pressure on the spring at all times. It is to be clearly understood that the collar or attachment as herein disclosed is provided to allow end motion and is not a take-up collar.

When the device is being applied, the collar C is gripped with one hand while the nut 11 is being tightened with the other but little pressure of the nut 11 on the collar C being required.

My improved collar may be defined as being flexible and designed for use as an emery wheel arbor attachment for gang, band and circular saw grinders. It has been demonstrated in practice that my improved collar or attachment permits the grinder to sharpen the teeth uniformly and to a point without the use of a file for finishing. It can be attached directly to the arbor of any grinder and in that way is superior to other devices in use which require arbor extensions.

It has also been effectively established in practice and to the satisfaction of experts that my improved collar effects a saving in saw steel from forty to sixty percent in that only from $\frac{3}{16}''$ to $\frac{1}{4}''$ need be ground off a band saw in thirty days whereas without the collar $\frac{3}{8}''$ or more will be removed in the same length of time. It keeps the emery wheel in good shape and eliminates the need for using an emery wheel dresser for trueing the wheel. The saw teeth are ground uniformly inducing the manufacture of more and better lumber.

From the foregoing description it is thought to be obvious that a flexible collar constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In an article of the character described, a collar comprising a relative broad annular outer portion, an annular web formed about the inner wall at the center thereof, a flange formed throughout the edge of said web and projecting laterally therefrom, concentric with and to a point in the same plane as the adjacent edge of the outer portion, a washer surrounding said flange and adapted to be entirely received in the space between the web and the edges of the flange and outer portion, a resilient member interposed between said washer and said web and normally urging the washer outwardly, means for securing the article in position on an arbor, and a coupling pin between said collar and said washer, carried by the outer portion of the collar, and engaging in a notch formed transversely of the periphery of the washer.

2. In an article of the character described, a collar comprising a relatively broad annular outer portion, an annular web formed about the inner wall at the center thereof, a flange formed throughout the edge of said web and projecting laterally therefrom, concentric with and to a point in the same plane as the adjacent edge of the outer portion, a washer surrounding said flange and the edges of the flange and outer portion, a resilient member interposed between the said washer and web and normally urging the washer outwardly, means for establishing screw-thread connection between said flange and supporting arbor, a nut designed to be threaded upon the arbor and to extend into the outer portion to bear against said web, and a coupling pin between said collar and said washer, carried by the outer portion of the collar, and engaging in a notch formed transversely of the periphery of the washer.

In testimony whereof I hereunto affix my signature.

RYLAND P. BRYANT.